UNITED STATES PATENT OFFICE.

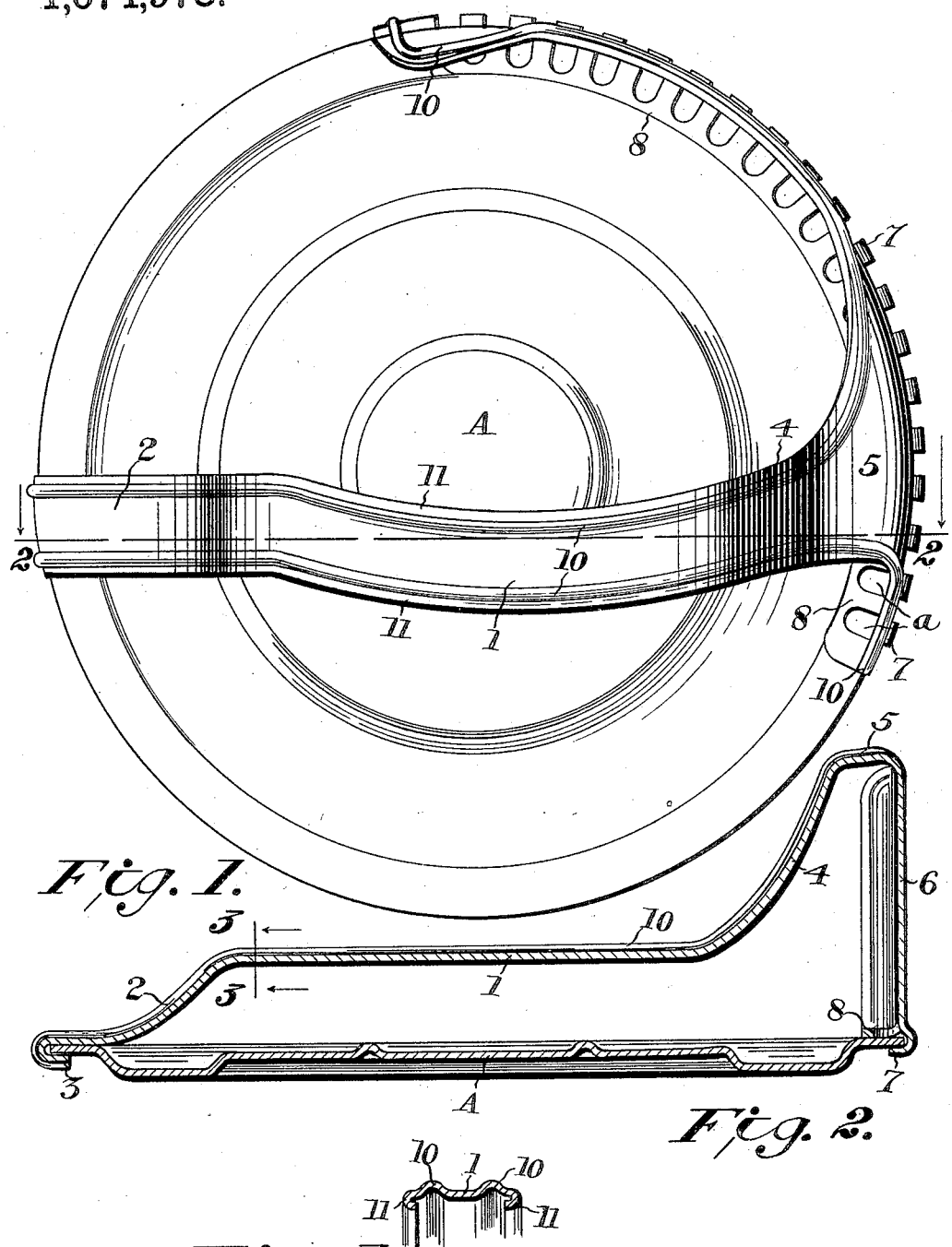

EVA RELYEA, OF POUGHKEEPSIE, NEW YORK.

POT-LID.

1,074,978.

Specification of Letters Patent.

Patented Oct. 7, 1913.

Application filed December 8, 1911. Serial No. 664,587.

*To all whom it may concern:*

Be it known that I, EVA RELYEA, a citizen of the United States, and a resident of Poughkeepsie, in the county of Dutchess and State of New York, have invented certain new and useful Improvements in Pot-Lids, of which the following is a specification, reference being had to the accompanying drawings.

This invention has relation to certain new and useful improvements in hand shielding lids employed in connection with culinary vessels, such as pots and kettles, and comprises a handle forming shield arranged to be secured to the lid; and the object of my invention is to provide a shield of this general character, of simple construction, which shall be capable of convenient and accurate adjustment in position upon the edge of a lid to serve as a handle for the same and as a shield protecting the hand and wrist while draining the pot or kettle of boiling water or other liquids.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, shows a top view of a lid with my shield attached thereto. Fig. 2, is a section on line 2, 2, of Fig. 1. Fig. 3, is a section on line 3, 3, of Fig. 2.

Where it is necessary to drain boiling water from potatoes and other vegetables or from food that requires to be parboiled, or where boiling broth is drawn from meat, it is a difficult matter to hold the lid, as ordinarily constructed, upon the pot, which must be done in a manner partly uncovering the pot without scalding the hand or wrist of the cook. A common expedient is for the person to shield the hand by means of a cloth. This makes the secure holding of the lid a difficult matter, and in order to overcome this objection, I provide an attachment which can be easily sprung upon a lid and which is constructed to shield the hand and wrist holding the lid to the pot, while further serving as a handle.

In the accompanying drawings A, designates a suitable pot lid. The shield as used in my invention comprises a sheet metal member 6, which when secured to the lid extends at right angles thereto and forms in effect an outstanding flange, as shown in Fig. 2. This shield-forming portion 6 is provided with a base flange 8, extending at right angles to the shield 6, and stamped out of this base flange 8 are the fingers 7. As shown in Fig. 2, these fingers 7 extend parallel to the base flange 8. The stamping out of the fingers leaves the openings —a—, shown in Fig. 1, in the flange 8.

A handle 1 is continued from the shield 6 in the flat top portion 5, as shown in Fig. 2, from which the handle is bent downwardly in the curved portion 4, from which the handle 1 proper is continued horizontally to the base flange 8. As shown in Fig. 2, the handle 1 ends in the downwardly curved portion 2, terminating in the recurved lip 3. The attachment is made of sheet metal so that the same is resilient and to add sufficient rigidity to the shield I provide the parallel running skirting beads 10, while the handle-forming portion 1 is further strengthened in having its opposite edges 11, as more clearly shown in Fig. 3, recurved. This not only imparts rigidity to the handle, but also makes the device convenient to handle.

As shown in Fig. 1, when the shield is sprung upon the lid A, the handle extends in a line beyond the center or diameter of the lid A. This is necessary so that the handle cannot possibly casually slip out of the shield. As shown in Fig. 1, the shield approximately engages one-third of the circumference of the lid, the recurved lip 3 being at the end approximately opposite the center of the shield. The shield 6 is of a height sufficient to insure the full protection of the operator's hand and wrist. In the use of the lid the shield of course is brought to the lowermost portion or at the draining point of the pot.

It is of course understood that the attachment is made in various sizes so that there will be one size of shield for each size of lid. While I have shown and described the shield as being detachably secured to the lid, it should of course be understood that the shield may be riveted to the lid or form a fixed part thereof. The handle 10 forms a convenient means for handling the lid.

The device is simple and inexpensive in construction and both durable and efficient in operation and can be adjusted upon or removed from the lid with ease, accuracy and despatch.

Having thus described my said invention, what I claim as new and desire to secure by United States Letters Patent is:

1. The combination with a lid, of a shield made of sheet metal comprising a curved plate having a base flange bent at right angles with a plurality of integral fingers stamped out of said flange and held parallel thereto, an integral handle-forming section extending downward from near one end of said plate and then continuing parallel with said base flange and terminating in a downwardly bent end ending in a recurved lip, said lid being removably held below said lip and between said base flange and fingers.

2. As a new article of manufacture, a lid attachment made of sheet metal comprising a curved portion forming a shield having a base flange bent at right angles with a plurality of integral fingers stamped out of said flange and held parallel thereto, an integral handle-forming section extending downwardly from near one end of said shield and then continuing parallel with said base flange and terminating in a downwardly bent end ending in a recurved lip.

3. As a new article of manufacture, a lid attachment comprising a shield made of sheet metal ending in a recurved securing flange, a handle forming portion extending from said shield at the edge opposite said flange and terminating in a recurved lip.

4. As a new article of manufacture, a device of the character described comprising a curved shield made of sheet metal having a base flange bent at an angle to said shield with a plurality of integral fingers stamped out of said flange, an integral handle-forming section extending from said shield strengthened by means of edge beads said handle section terminating in a recurved lip.

5. A device of the character described made of sheet metal and comprising a narrow strip bent at one end to form a recurved securing lip and at the other end ending in an enlarged curved shield, extending transversely to the handle, said enlarged shield ending in a flange from which extend integral fingers said flange and fingers adapted to be used clasped upon the edge of the lid.

In testimony whereof I affix my signature, in presence of two witnesses.

EVA RELYEA.

Witnesses:
JULIA E. RELYEA,
MINNIE H. RELYEA.

---

Copies of this patent may be obtained for five cents each, by addressing the "Commissioner of Patents, Washington, D. C."